US012013530B2

(12) United States Patent
Janzer

(10) Patent No.: US 12,013,530 B2
(45) Date of Patent: Jun. 18, 2024

(54) WAVEGUIDE DISPLAY ASSEMBLY FOR A 3D HEAD-UP DISPLAY DEVICE IN A VEHICLE, AND METHOD FOR OPERATING SAME

(71) Applicant: Bayerische Motoren Werke Aktiengesellschaft, Munich (DE)

(72) Inventor: Michael Arthur Janzer, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/010,527

(22) PCT Filed: Jul. 8, 2021

(86) PCT No.: PCT/EP2021/068980
§ 371 (c)(1),
(2) Date: Dec. 15, 2022

(87) PCT Pub. No.: WO2022/037844
PCT Pub. Date: Feb. 24, 2022

(65) Prior Publication Data
US 2023/0305298 A1 Sep. 28, 2023

(30) Foreign Application Priority Data
Aug. 18, 2020 (DE) ...................... 10 2020 121 647.5

(51) Int. Cl.
*G02B 27/01* (2006.01)
*H04N 13/315* (2018.01)

(52) U.S. Cl.
CPC ....... *G02B 27/0101* (2013.01); *H04N 13/315* (2018.05); *G02B 2027/0134* (2013.01)

(58) Field of Classification Search
CPC ........ G02B 27/0101; G02B 2027/0134; H04N 13/315
See application file for complete search history.

(56) References Cited

U.S. PATENT DOCUMENTS 10,690,851 B2 * 6/2020 Waldern ................. G02B 6/126
11,662,591 B1 * 5/2023 Dehkordi ........... G02B 27/0172
359/630

(Continued)

FOREIGN PATENT DOCUMENTS

DE  10 2014 008 153 A1  10/2014
DE  10 2016 123 568 A1   6/2017

(Continued)

OTHER PUBLICATIONS

International Search Report (PCT/ISA/210) issued in PCT Application No. PCT/EP2021/068980 dated Oct. 18, 2021 with English translation (four (4) pages).

(Continued)

*Primary Examiner* — Ariel A Balaoing
(74) *Attorney, Agent, or Firm* — Crowell & Moring LLP

(57) ABSTRACT

A waveguide display assembly includes a flat waveguide; a passage filter layer, which is divided into a plurality of area segments, which can be switched to light passage independently of each other; an image-generating unit, which is configured to generate different 2D images, each of which is intended only for one eye of a user for autostereoscopic 3D presentation, and to couple the 2D images into the waveguide in the form of collimated light beams, the propagation directions of which correspond to individual pixels; and a control unit, which is configured to control the image-generating unit and the passage filter layer such that only one or a subset of the area segments is switched to light passage at a time and, synchronously therewith, the image-generating unit generates only one image area segment of the 2D image intended for one eye of the user.

15 Claims, 4 Drawing Sheets

(56) References Cited

U.S. PATENT DOCUMENTS

| | | | | |
|---|---|---|---|---|
| 2007/0091638 | A1* | 4/2007 | Ijzerman | H04N 13/359 |
| | | | | 348/E13.044 |
| 2010/0214635 | A1* | 8/2010 | Sasaki | G02B 27/0101 |
| | | | | 359/619 |
| 2012/0224062 | A1* | 9/2012 | Lacoste | G09G 5/14 |
| | | | | 348/148 |
| 2012/0314145 | A1* | 12/2012 | Robinson | G02B 30/33 |
| | | | | 349/15 |
| 2014/0104665 | A1 | 4/2014 | Popovich et al. | |
| 2016/0139402 | A1* | 5/2016 | Lapstun | G02B 30/27 |
| | | | | 349/193 |
| 2016/0349507 | A1* | 12/2016 | Hayashi | G02B 27/01 |
| 2017/0139097 | A1* | 5/2017 | Robinson | H04N 13/32 |
| 2017/0161949 | A1 | 6/2017 | Seder et al. | |
| 2019/0293950 | A1 | 9/2019 | Osmanis et al. | |

FOREIGN PATENT DOCUMENTS

| | | |
|---|---|---|
| EP | 2 842 003 B1 | 2/2019 |
| WO | WO 2017/060665 A1 | 4/2017 |
| WO | WO 2017/162999 A1 | 9/2017 |
| WO | WO 2020/091816 A1 | 5/2020 |

OTHER PUBLICATIONS

German-language Written Opinion (PCT/ISA/237) issued in PCT Application No. PCT/EP2021/068980 dated Oct. 18, 2021 (seven (7) pages).

German-language Search Report issued in German Application No. 10 2020 121 647.5 dated Apr. 12, 2021 with partial English translation (10 pages).

* cited by examiner

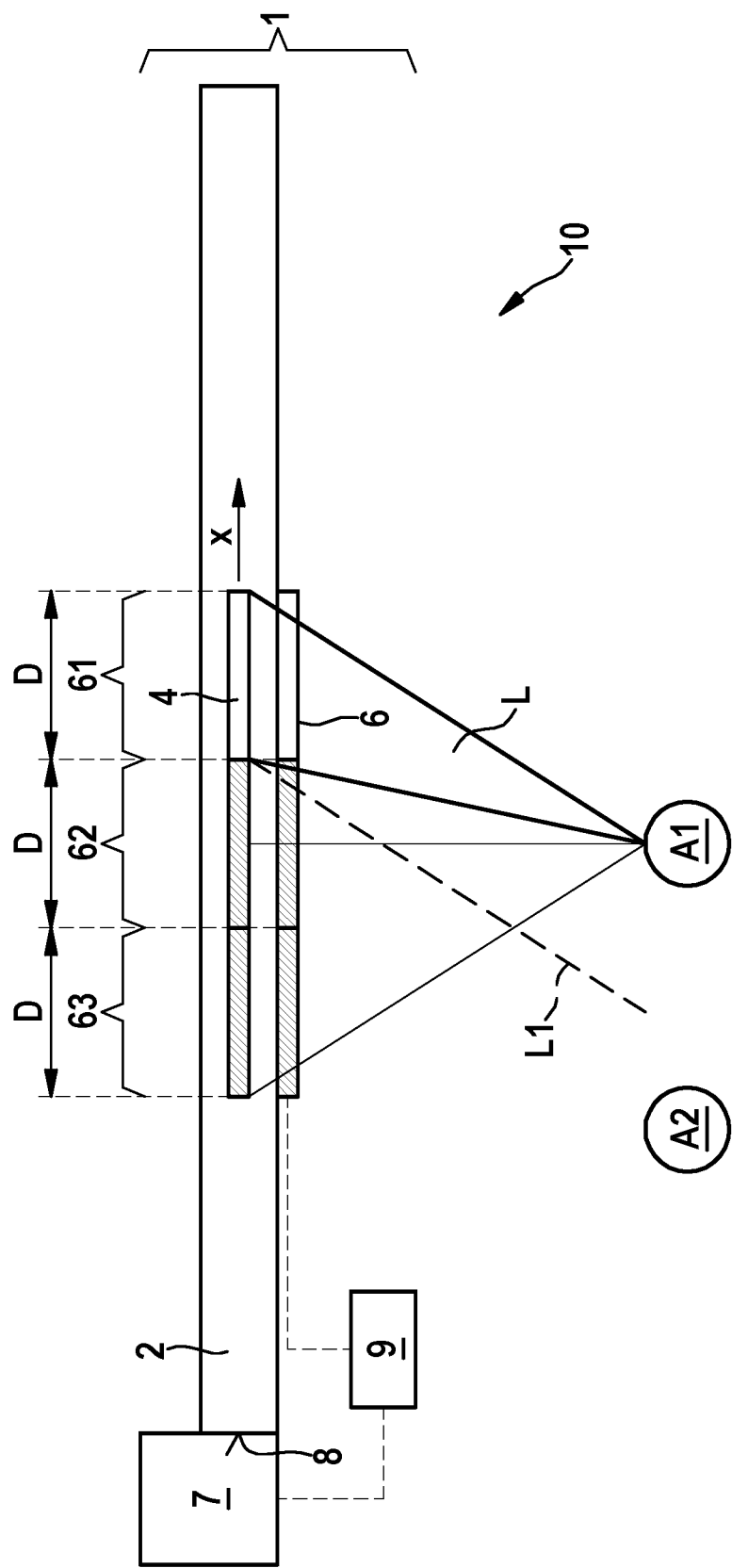

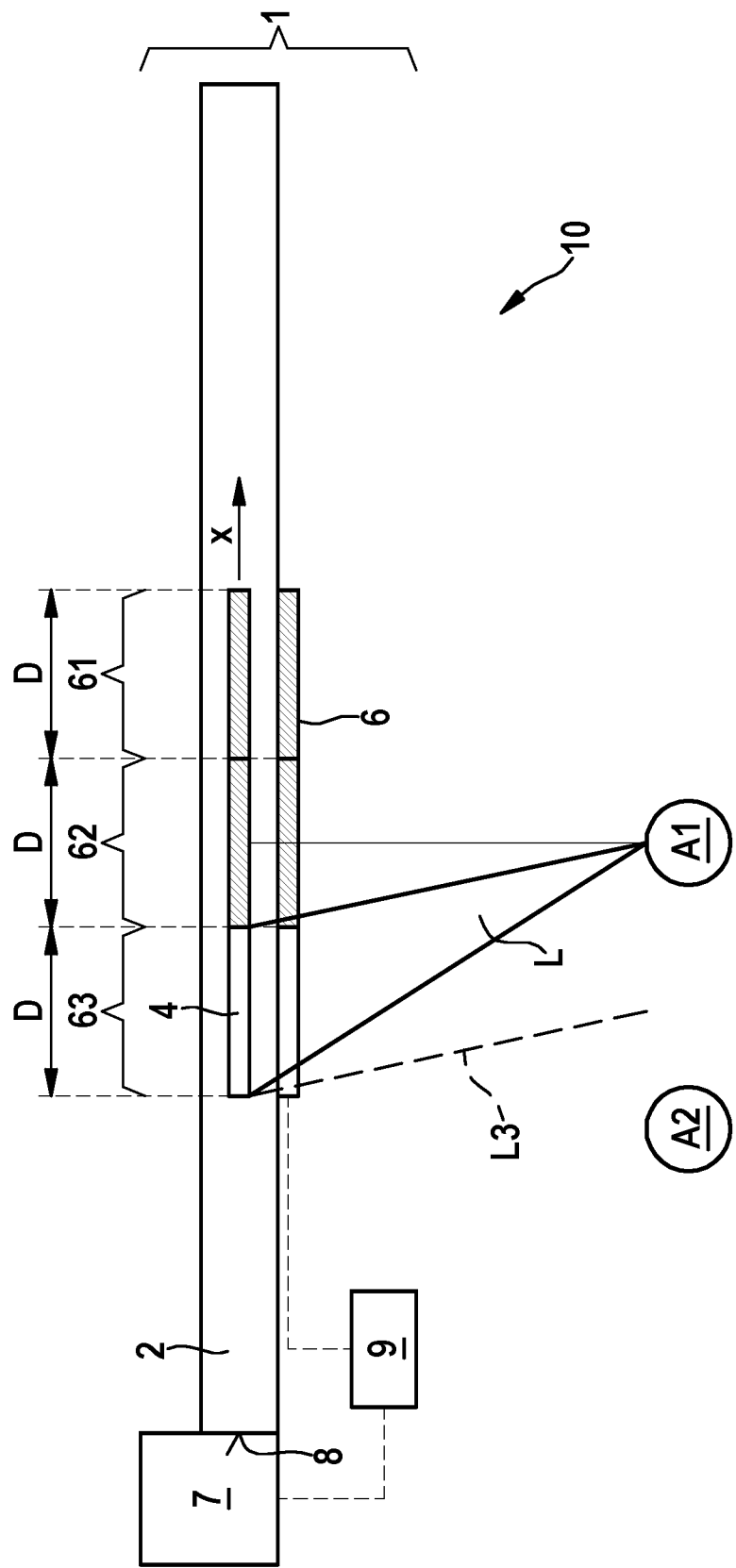

WAVEGUIDE DISPLAY ASSEMBLY FOR A 3D HEAD-UP DISPLAY DEVICE IN A VEHICLE, AND METHOD FOR OPERATING SAME

BACKGROUND AND SUMMARY OF THE INVENTION

The invention relates to a waveguide display assembly for an autostereoscopic 3D head-up display device, which can be used in particular in a motor vehicle or other types of vehicle. The head-up display device is designed to generate a 3D virtual image projected in the user's field of view by reflection at a reflection pane that is at least partially transparent, in particular a windscreen of the vehicle. The display assembly is based on a waveguide in order to create a relatively large virtual 3D image in a small installation space. The invention also relates to a method for operating the waveguide display assembly as well as to the head-up display device and a vehicle equipped therewith.

Field-of-view display devices are known specifically by the term Head-up Display (HUD). For example, in a motor vehicle, a desired display content, such as a speed limit indication or other useful navigation and vehicle operating information or even entertainment content, can be superimposed on the real environment in front of the vehicle in the form of a virtual image observed by the driver or other occupant. To this end, a classical head-up display device comprises a display accommodated below a top side of the instrument panel with a suitable display and projection optics to create a projected beam of light with the desired display content and to cast it onto a reflection pane that is at least partially transparent, such as the windscreen of the motor vehicle or a combiner pane specifically provided in front of it, in such a way that the light beam is reflected from it toward the viewer in order to project the virtual image into the user's field of view in front of or behind the reflection pane.

As an alternative to the classical HUD design, in which the imaging and projection optics in the beam path following the display typically comprises an imaging and/or enlarging concave mirror, the size of which is scaled linearly with the HUD image, a HUD design with a waveguide display is known, in particular for AR (augmented reality) applications. By using a planar waveguide (optical waveguide), the installation space required for the HUD in relation to the size of the virtual image can be considerably reduced compared to the classical design.

An autostereoscopic 3D HUD creates a virtual image with a 3D or depth effect without the need for the user (i.e. the viewer of the virtual image) to use wearables such as 3D goggles and the like. To this end, in a known manner a separate 2D image is generated for each eye of the user, each showing a slightly different perspective of the 3D image to be displayed. Such a head-up display device thus usually has separate eyeboxes, which define a predetermined region of space for only one eye of the user, from which they can see the 2D image intended for that eye. By adjusting the image contents intended for different eyes of the user and their relative position, a 3D impression can be generated by exploiting the parallax effect.

In this context, for example, EP 2 842 003 B1 discloses a holographic wide-angle display comprising an input image node which is designed to provide at least first and second image-modulated lights, and a holographic waveguide device which is designed to transmit at least one of the first and second image-modulated lights in at least one first direction. The holographic waveguide device comprises distributed pluralities of switchable Bragg grating elements, with each plurality of switchable Bragg grating elements having a Bragg grating geometry that corresponds to a single field-of-view region, and with the first and second image-modulated lights each being modulated with first field-of-view imaging information and second field-of-view imaging information. The first plurality of switchable Bragg grating elements is designed to deflect the first image-modulated light by diffraction into a first plurality of output beams that form a first field-of-view region, and the second plurality of switchable Bragg grating elements is designed to deflect the second image-modulated light by diffraction into a second plurality of output beams that form a second field-of-view region. Specifically, the device according to EP 2 842 003 B1 can be part of a stereoscopic display in which the first and second image-modulated light provides left-eye and right-eye perspective views. It can also be part of a HUD.

However, one result of such an approach to autostereoscopic 3D image generation via a waveguide display is that, in contrast to a conventional waveguide display which does not contain any separately switchable Bragg grating elements and instead emits light for each pixel from its entire light-emission surface, an additional measure for homogenizing the image must be installed in the picture generating unit (PGU) that generates the image to be coupled into the waveguide. This is because the diffraction efficiency of the holographic material in a normal waveguide display has a gradient along the expansion axis(axes) in the direction of which the light in the waveguide propagates, to display a uniformly illuminated image throughout the entire eyebox. This gradient could no longer be applied in the method according to EP 2 842 003 B1, since in this publication light is only emitted from the waveguide at individual Bragg grating elements in a spatially limited manner at any time, and thus the gradient in the decoupling efficiency would lead to a gradient in the image illumination. Moreover, with such a gradient, the system would become very inefficient for those parts of the image that would be decoupled via Bragg grating elements close to the injection point. In contrast to a conventional waveguide display, the decoupling efficiency would therefore have to be spatially constant. However, this would result in a brightness gradient in the displayed image, and no simple countermeasures are available at present.

A conventional waveguide display, however, in which light is always decoupled from its entire light-emission surface for each pixel, is not designed for autostereoscopic 3D imaging, because both eyes of the user would always receive both 2D images. For an autostereoscopic 3D image display, however, the 2D image intended for one eye must not reach the spatial region (eyebox) intended for the other eye.

It is the object of the present invention to specify an alternative autostereoscopic 3D head-up display which is improved compared with the prior art, in particular with regard to the image quality. In particular, this may increase its suitability for use in a motor vehicle or other land-based, airborne or water-borne vehicle for the purposes mentioned above.

DISCLOSURE OF THE INVENTION

This object is achieved by a waveguide display assembly for an autostereoscopic 3D head-up display device, a corresponding autostereoscopic 3D head-up display device, a corresponding operating method, and a vehicle equipped with the above according to the claimed invention. All further features and effects mentioned in the claims and in the following description for the waveguide display assembly also apply with regard to its operating method, the head-up display device as well as to the vehicle, and vice versa.

According to a first aspect, a waveguide display assembly for an autostereoscopic 3D head-up display device (hereafter also simply referred to as "head-up display device") is provided, which may be designed in particular for use in a motor vehicle or any other land-based, airborne or waterborne vehicle. In particular, the display device may be a head-up display (HUD).

The waveguide display assembly comprises a flat, in particular planar, waveguide (optical waveguide) with a light-emission surface designed with a flat side having a surface area corresponding to the one- or two-dimensional extent of the eyebox, for light that is coupled into the waveguide laterally, in particular at a front face thereof, during operation of the display assembly. In the beam path of the emitted light, a passband filter layer is also provided, which completely covers the light-emission surface and in this covered area, i.e. in the beam path of the emitted light, is divided into a plurality of area segments that can be switched to light transmission independently of one another.

Furthermore, the waveguide display assembly comprises an image-generating unit designed to generate two different 2D images, each intended for only one eye of the user for autostereoscopic 3D display, and to couple these images into the waveguide in the form of collimated light beams, the propagation directions of which correspond to the individual picture elements.

In addition, the waveguide display assembly has a control unit designed and configured to control the image-generating unit and the passband filter layer in such a way that only one or a subset of the area segments is/are switched to light transmission at a time and that, synchronously therewith, the image-generating unit generates only one image area segment or segments of the 2D image intended for one eye of the user, said image area segment(s) being such that the light beams transmitted by the passband filter layer cannot reach a spatial region (eyebox) predefined for the respective other eye of the user, but only reach a spatial region (eyebox) intended for the matching eye of the user. The 2D image intended for an eye of the user is constructed sequentially from such image area segments during operation.

By way of a temporally sequential construction of the 2D image intended for one eye of the user and a spatial limitation of the light decoupled from the waveguide through the passband filter layer, synchronized with the sequential image construction as described, a separation of the image contents for the left and right eye can be achieved in the present case. This means that the precondition for displaying 3D content is met without the need to divide the emitting element of the waveguide itself along its light-emitting surface into switchable Bragg grating segments, as is the case in the prior art mentioned above, with the associated disadvantages for image quality. Instead, in this approach a conventional waveguide can be used, in which light is always emitted over its entire light-emission surface.

One idea of the present waveguide display assembly for a 3D head-up display device is to implement the required eyebox separation for the two eyes of the user via switchable area segments of a passband filter layer specially designed for this purpose. Therefore, no additional measures for image homogenization are required in the image generation unit as compared to conventional 2D image generation, since the image-homogenizing effect of a conventional waveguide, which is normally provided anyway, retains its effect in this case.

For example, in a known way, the light-emission surface can have a light-emission efficiency gradient in its longitudinal direction in which light propagates in the waveguide and which corresponds to a horizontal direction of the eyeboxes designated for the user's eyes, so that a uniformly illuminated 2D image is generated throughout the associated eyebox.

In particular, the passband filter layer can be designed as a liquid crystal layer with at least one polarization filter for switching the area segments thereof between a light-transmitting and a light-blocking state. In particular, two polarization filters with crossed, for example mutually orthogonal, polarization directions on the two sides of the liquid crystal layer can be provided. However, a single polarization filter at the output of the liquid crystal layer may well be sufficient if the light emitted from the waveguide is sufficiently polarized. With this or any other specific design, the passband filter layer can be permanently connected to the waveguide. This can result in particular in a particularly compact and robust design of the waveguide display assembly. For example, the passband filter layer can be directly adjacent to the light-emission surface. Alternatively, an air gap with a predetermined thickness of, for example, approximately 0.1 mm to approximately 10 mm can be enclosed between the passband filter layer and the light-emission surface.

According to one embodiment, the passband filter layer is divided into exactly three area segments in a longitudinal direction of the light-emission surface, which corresponds to a horizontal direction of the spatial regions (eyeboxes) predefined for the user's eyes. However, depending on the geometry of the head-up display device in a specific application, for example for a specific vehicle geometry or size, exactly two area segments may be sufficient. For similar reasons, the passband filter layer may be divided into four or more area segments in the longitudinal direction of the light-emission surface. For a suitable choice of the number of area segments in a specific application, the essential requirement is that the area segments must be selected in such a way as to guarantee that at no time will image contents intended for the right eye reach the left eye, and vice versa.

If the 2D images for both eyes are generated consecutively and are constructed from image area segments generated consecutively using area segments switched consecutively, the result is a maximum switching frequency with which the individual steps of the image construction sequence are traversed and which can be estimated according to the following formula:

$$fs=(\text{frame\_rate})*2*nB,$$

where fs is the frequency at which a single area segment is switched, (frame_rate) is a desired frame repetition rate for complete 2D images, and nB stands for the total number of the switchable area segments. With frame_rate=60 Hz and nB=3, the switching frequency of the individual area segments of the passband filter layer already results in a value of 360 Hz. It may therefore be practical to select nB as small as possible or, if possible, to display non-conflicting combinations of passband filter surface and image surface segments simultaneously.

In particular, a length of the individual area segments of the passband filter layer in the above-mentioned longitudinal direction of the light-emission surface can be
between approximately 1 mm and approximately 80 mm, preferably between approximately 2 mm and approximately 60 mm, particularly preferably between approximately 3 mm and approximately 40 mm; and/or essentially the same for all area segments.

According to a further aspect an autostereoscopic 3D head-up display device is provided, which may be specifically designed for use in a motor vehicle or other land-based, airborne or water-borne vehicle. The above-mentioned head-up display comprises a waveguide display assembly of the kind set forth herein, and an at least partially transparent reflection pane, in particular a windscreen of the vehicle, which is arranged in the user's field of view and designed to reflect the collimated light beams generated by the waveguide display assembly toward the user's eyes so that a virtual 3D image appears in the user's field of view in front of or behind the reflection pane.

According to a further aspect, a method for operating a waveguide display assembly of the kind set forth herein is provided, wherein the image generation unit and the passband filter layer are controlled by its control unit in such a way that
only one or a subset of the mentioned area segments at a time is/are switched to light transmission and
synchronously therewith, the image-generating unit generates only one image area segment or only those area segments of the 2D image intended for one eye of the user, said image area segment(s) being such that the light beams transmitted by the passband filter layer cannot reach a spatial region (eyebox) predefined for the respective other eye of the user, but only reach a spatial region (eyebox) intended for the matching eye of the user,
wherein the respective 2D image is built up sequentially from such image area segments.

The position data of the two eyes of the user required for controlling the waveguide display assembly in this way can be obtained, for example, by way of eye-tracking. This can be implemented, for example, by way of a suitable camera-based monitoring system. In particular, the spatial regions (eyeboxes) designated for the respective eye of the user can be determined from this.

In particular, the image-generating unit and the passband filter layer can be controlled by the control unit in such a way that
a plurality of the above-mentioned area segments of the passband filter layer are simultaneously switched to light transmission, at least intermittently,
while in the image-generating unit, synchronously therewith, only image area segments of the respective 2D images are generated such that the light beams transmitted by the passband filter layer cannot reach the eyebox predefined for the respective other eye of the user, but can only reach the eyebox predefined for the matching eye of the user. In this way, in particular, the above-mentioned switching frequency of the individual area segments can be reduced.

Alternatively or in addition, the image-generating unit and the passband filter layer can be controlled by the control unit in such a way that the 2D image intended for the left eye of the user and the 2D image intended for the right eye of the user
are generated alternately, in particular by alternating construction of the entire respective 2D image, or
are generated at least partially simultaneously, in particular by simultaneously switching different area segments of the passband filter layer to light transmission.

This also allows, in particular, the above-mentioned switching frequency of the individual area segments to be reduced.

According to a further aspect, a vehicle, in particular a motor vehicle or any other land-based, airborne or water-borne vehicle, is also envisaged. The vehicle comprises a windscreen and an instrument panel arranged below it. The vehicle also comprises an autostereoscopic 3D head-up display device of the kind set forth herein, the reflection pane of which is formed by the windscreen or a combiner pane arranged in front thereof inside the vehicle and the waveguide display assembly of which is arranged in the instrument panel in such a way that the light beams generated by the waveguide display assembly are cast onto the reflection pane and reflected from there to the eyes of a vehicle occupant, creating a virtual 3D image in the occupant's field of view in front of or behind the reflection pane. In particular, the control unit of the waveguide display assembly can be designed to carry out a method described above.

The above aspects of the invention and its embodiments and specific designs are explained in more detail below using the examples shown in the attached drawings. For clarity of illustration, at least some of the drawings are kept purely schematic; they are therefore generally not to be understood as true to scale.

BRIEF DESCRIPTION OF THE DRAWINGS

FIG. 2a shows the lateral sectional view of the waveguide display assembly as shown in FIG. 1, during a first step of a three-stage image-building sequence for the 2D image for a user's right eye.

FIG. 2c shows the lateral sectional view of the waveguide display assembly as shown in FIG. 1, during a third step of the three-stage image-building sequence for the 2D image for the user's right eye.

DETAILED DESCRIPTION OF THE DRAWINGS

All the different designs, variants and specific design features of the waveguide display assembly, the head-up display device, the method and the vehicle as specified in the above aspects of the invention and referred to above in the description and in the following claims may be implemented in the examples shown in FIGS. 1 to 2c. Therefore, they will not all be repeated in the following. The same applies accordingly to the definitions of terms and effects already given above in relation to individual features shown in FIGS. 1-2c.

Figure 1:
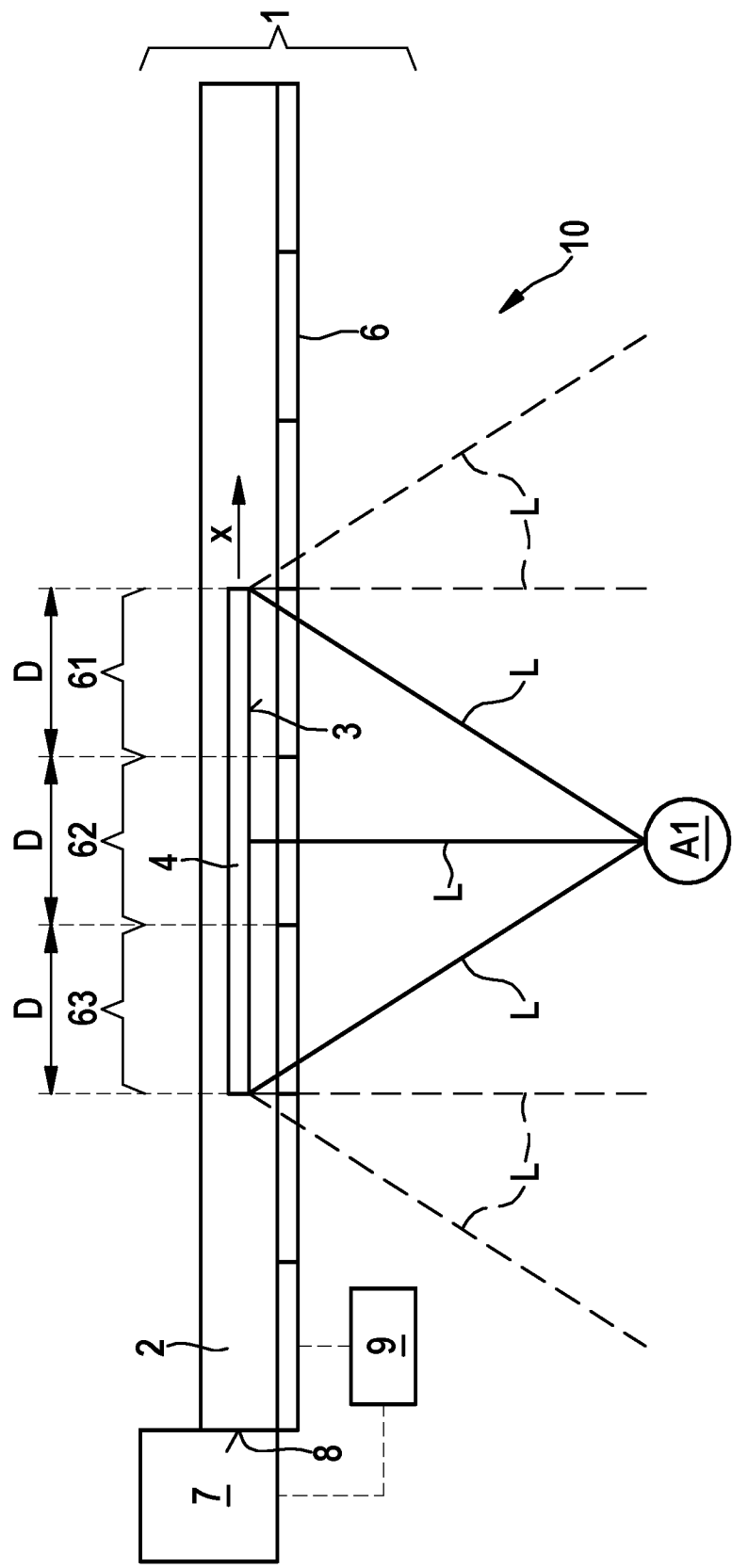
FIG. 1 shows a lateral sectional view of a waveguide display assembly of the kind set forth herein.

FIG. 1 shows an example of a waveguide display assembly 1 of an autostereoscopic 3D head-up display device 10 of the kind set forth herein in a highly simplified schematic lateral sectional view. The head-up display device 10 may be in particular a head-up display (HUD) for use in a motor vehicle.

The waveguide display assembly 1 comprises a flat, in this example planar, waveguide 2 with a light-emission surface 4 formed in its flat side 3 (which is only symbolically indicated in the figures and actually corresponds to a surface of the waveguide) for light that is coupled into the waveguide 2 laterally, in this example at a left front face 8 of the waveguide 2, during operation of the waveguide display assembly 1. (In FIGS. 1 to 2c, for better recognition the light-emission surface 4 is only indicated as a schematic separately drawn rectangular light-emission element.) In addition, the waveguide display assembly 1 comprises a passband filter layer 6, which completely covers the light-emission surface 4 and can be directly adjacent to the light-emission surface 4.

In this example, the passband filter layer 6 is divided into exactly three area segments 61, 62 and 63, which can be switched independently to light transmission, in the beam path of the light L that is decoupled from the light-emission surface 4. As described above, this sub-division into three area segments should only be regarded as an exemplary embodiment that has proven to be successful for a typical motor vehicle geometry.

Depending on the particular vehicle geometry, there may be more or fewer area segments than in FIGS. 1 and 2a-2c. The only principle is that the area segments must be selected in such a way as to guarantee that image contents intended for the autostereoscopic 3D image display for the right eye A1 of a user can at no time reach the user's left eye A2, and vice versa. In this example, the passband filter layer 6 is designed as a liquid crystal layer with a polarization filter for switching its area segments 61, 62, 63 between a light-transmitting and a light-blocking state. The individual area segments 61, 62 and 63 are macroscopic and in a longitudinal direction X of the light-emission surface 4, which corresponds to a horizontal direction of the eyeboxes predefined for the eyes A1, A2 of the user, they have, purely by way of example, equal lengths D in the range 3 mm<D<40 mm.

The waveguide display assembly 1 also comprises an image generating unit 7, which is designed to generate two different 2D images, each intended for autostereoscopic 3D display for only one of the user's eyes. The image generation unit 7 is designed to couple these 2D images into the waveguide 2 in the form of collimated light beams, the propagation directions of which correspond to the individual picture elements.

Furthermore, the waveguide display assembly 1 also comprises a control unit 9, which is designed to control the image-generating unit 7 and the passband filter layer 6 in such a way that only one or a subset of the area segments 61, 62, 63 is/are switched to light transmission at a time and that, synchronously therewith, the image-generating unit 7 generates only one image area segment or segments of the 2D image intended for one eye A1, A2 of the user, said image area segment(s) being such that the light beams transmitted by the passband filter layer 6 cannot reach a spatial region (eyebox) predefined for the respective other eye of the user.

A corresponding example of an operating method of the kind set forth herein, which can be carried out in the waveguide display assembly 1 according to FIG. 1 by its control unit 9, is described below by reference to FIGS. 2a to 2c. In this case, only the area segments 61, 62, 63 of the passband filter layer 6 mentioned above are drawn and relevant to the present context, which are arranged in the beam path of the light L which is coupled out via the light-emission surface 4 of the waveguide 2 and thus overlap it.

The autostereoscopic 3D head-up display device 10 of the kind set forth herein comprises, in addition to the waveguide display assembly 1, an at least partially transparent reflection pane, not drawn in FIG. 1 for reasons of presentation. This should be arranged in the beam path of the light L generated by the waveguide display assembly 1 in the user's field of view in such a way that the light is reflected to the eyes A1 and A2 of the user, so that a virtual 3D image (not shown) appears in the user's field of view in front of or behind the reflection pane. For example, this reflection pane can be formed by a windscreen of the vehicle.

FIG. 2a shows the lateral sectional view of the waveguide display assembly as shown in FIG. 1 during a first step of a three-stage image-building sequence for the 2D image for a right eye A1 of a user. In this first step, only the first (right-hand in FIG. 2a) area segment 61 of the passband filter layer 6 is switched to light transmission, while the other two area segments 62 and 63 are in their light-blocking state (shown hatched) and do not transmit the light in the part of the light-emitting surface 4 behind them. Synchronously with this, the image content generated in the image-generating unit 7 is limited to the outer right third of the 2D image for the right eye A1 of the user. As a result, only the light beams L which pass through the first area segment 61 reach the right eye A1. These light beams cannot reach the user's left eye A2. The critical beam L1 (dashed) for this condition at the edge of the image area segment generated in FIG. 2a is transmitted at the left edge of the active area segment 61.

Figure 2B:
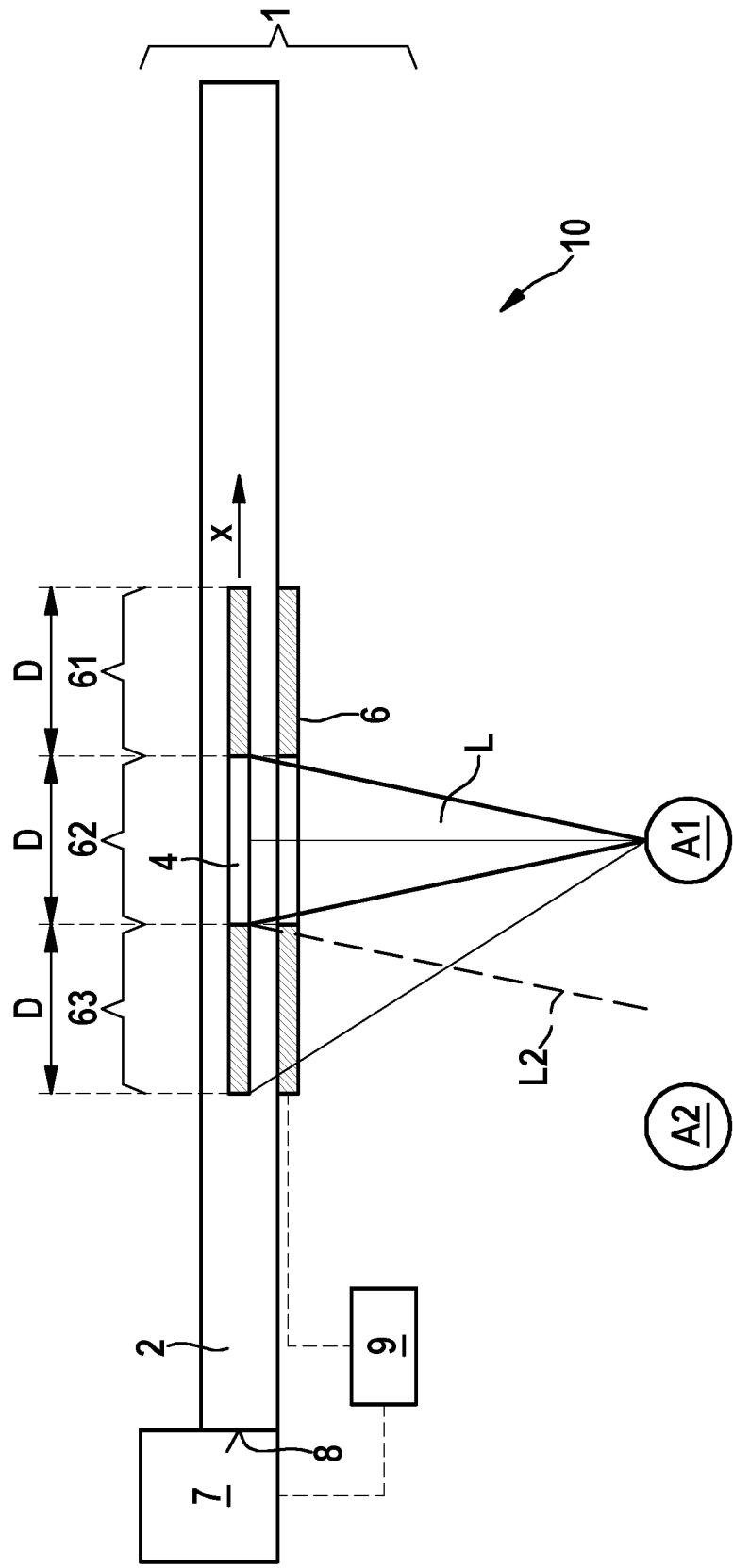
FIG. 2b shows the lateral sectional view of the waveguide display assembly as shown in FIG. 1, during a second step of the three-stage image-building sequence for the 2D image for the user's right eye.

FIG. 2b shows the lateral sectional view of the waveguide display assembly as shown in FIG. 1, during a second step of the three-stage image-building sequence following the first step of FIG. 2a for the 2D image for the right eye A1 of the user. In this step, only the central area segment 62 of the passband filter layer 6 is switched to light transmission, while the other two area segments 61 and 63 are in their light-blocking state (shown hatched) and do not transmit the light in the part of the light-emitting surface 4 behind them. Synchronously with this, the image content generated in the image-generating unit 7 is now limited to a central third of the 2D image for the right eye A1 of the user. As a result, only the light beams L which pass through the second area segment 62 reach the right eye A1. Again, these light beams, the critical beam L2 of which is shown dashed, cannot reach the user's left eye A2.

FIG. 2c shows the lateral sectional view of the waveguide display assembly as shown in FIG. 1, during a third step of the three-stage image-building sequence following the second step of FIG. 2b for the 2D image for the right eye A1 of the user. In this step, only the left-hand area segment 63 of the passband filter layer 6 is now switched to light transmission, while the other two area segments 61 and 62 are in their light-blocking state (shown hatched) and do not transmit the light in the part of the light-emitting surface 4 behind them. Synchronously with this, the image content generated in the image-generating unit 7 is now limited to only a left third of the 2D image for the right eye A1 of the user. As a result, only the light beams L which pass through the third area segment 63 reach the right eye A1. Again, these light beams, the critical beam L3 of which is shown dashed, cannot reach the user's left eye A2.

After completion of the 3-stage sequence described, the user's right eye A1 has received all the image information of the 2D image intended for that eye. At the same time, the left eye A2 has been prevented from seeing any part of this 2D image.

In this example, a 3-stage image building sequence with corresponding image contents and active area segments can then be executed for the left eye A2 in a similar way.

LIST OF REFERENCE SIGNS 1 waveguide display assembly
10 autostereoscopic 3D head-up display device
2 planar waveguide
3 flat side of the waveguide
4 light-emitting surface
6 passband filter layer
61, 62, 63 area segments of the passband filter layer
7 image generating unit
8 front face of the waveguide
9 control unit
L light emitted from the light-emitting surface
L1, L2, L3 critical beams in the sequential 2D image construction for the right eye
A1, A2 the right/left eye of the user, i.e. viewer of the virtual 3D image
X longitudinal direction of the light-emitting surface
D length of the area segment

The invention claimed is:

1. A waveguide display assembly for a 3D head-up display device, the waveguide display assembly comprising:
a flat waveguide with a light-emitting surface formed on a flat side of the waveguide, for light which is couplable laterally into the waveguide,
a passband filter layer, arranged in a beam path of emitted light, wherein the passband filter layer completely covers the light-emitting surface and is divided into a plurality of area segments which are switchable to light transmission independently of one another;
an image-generating unit which is configured to generate two different 2D images, each of which is intended for only one eye of a user for autostereoscopic 3D image presentation, and to couple the 2D images into the waveguide in a form of collimated light beams, wherein propagation directions of the collimated light beams correspond to individual pixels; and
a control unit which is configured to control the image-generating unit and the passband filter layer such that only one or a subset of the area segments is/are switched to light transmission at a time and that, synchronously therewith, the image-generating unit generates only one image area segment of the 2D image intended for one eye of the user, the image area segment being such that the light beams transmitted by the passband filter layer cannot reach an eyebox predefined for the respective other eye of the user.

2. The waveguide display assembly according to claim 1, wherein the light is couplable laterally into the waveguide at a front face of the waveguide.

3. The waveguide display assembly according to claim 1, wherein the passband filter layer:
is configured as a liquid crystal layer with at least one polarization filter for switching the area segments thereof between a light-transmitting and a light-blocking state, and/or
is fixedly connected to the waveguide, and/or
is either directly adjacent to the light-emitting surface or separated from the light-emitting surface by an air gap of a predefined thickness.

4. The waveguide display assembly according to claim 1, wherein the passband filter layer is divided into three or more area segments in a longitudinal direction of the light-emitting surface, wherein the longitudinal direction corresponds to a horizontal direction of eyeboxes predefined for the eyes of the user.

5. The waveguide display assembly according to claim 1, wherein the light-emitting surface in a longitudinal direction of the light-emitting surface has a light-emission efficiency gradient, such that an essentially uniformly illuminated 2D image is generated in an entire eyebox predefined for a respective eye, and the longitudinal direction corresponds to a horizontal direction of eyeboxes predefined for the eyes of the user.

6. The waveguide display assembly according to claim 1, wherein a length of the area segments in a longitudinal direction of the light-emitting surface, which longitudinal direction corresponds to a horizontal direction of eyeboxes predefined for the eyes of the user:
is between approximately 1 mm and approximately 80 mm; and/or
is essentially the same for all area segments.

7. The waveguide display assembly according to claim 1, wherein a length of the area segments in a longitudinal direction of the light-emitting surface, which longitudinal direction corresponds to a horizontal direction of eyeboxes predefined for the eyes of the user:
is between approximately 2 mm and approximately 60 mm, and/or is essentially the same for all area segments.

8. The waveguide display assembly according to claim 1, wherein a length of the area segments in a longitudinal direction of the light-emitting surface, which longitudinal direction corresponds to a horizontal direction of eyeboxes predefined for the eyes of the user:
is between approximately 3 mm and approximately 40 mm, and/or is essentially the same for all area segments.

9. An autostereoscopic 3D head-up display device comprising:
the waveguide display assembly according to claim 1; and
an at least partially transparent reflection pane, which is arranged in a field of view of the user and is configured to reflect the collimated light beam generated by the waveguide display assembly toward the eyes of thee user so that a virtual 3D image appears in the field of view of the user in front of or behind the reflection pane.

10. The autostereoscopic 3D head-up display device according to claim 9, wherein the at least partially transparent reflection pane is a windscreen of a vehicle.

11. A method for operating the waveguide display assembly according to claim 1, the method comprising controlling the image generation unit and the passband filter layer such that:
only one or a subset of the area segments at a time is/are switched to light transmission, and
the image-generating unit, synchronously with switching to light transmission, generates only one image area segment of the 2D image intended for one eye of the user, the image area segment being such that the light beams transmitted by the passband filter layer cannot reach the eyebox predefined for the other eye of the user,
wherein the respective 2D image is built up sequentially from the image area segments.

12. The method according to claim 11, further comprising controlling the image-generating unit and the passband filter layer such that:
a plurality of the area segments of the passband filter layer are simultaneously switched to light transmission, at least intermittently, and while in the image-generating unit, synchronously with switching to light transmission, only such image area segments of the respective 2D images are generated that do not allow the light beams transmitted by the passband filter layer to reach the eyebox predefined for the respective other eye of the user.

13. The method according to claim 11, further comprising controlling the image-generating unit and the passband filter layer such that the 2D image intended for the left eye of the user and the 2D image intended for the right eye of the user:
are generated alternately, by alternating construction of the entire respective 2D image, or
are generated at least partially simultaneously by simultaneously switching different area segments of the passband filter layer to light transmission.

14. The method according to claim 11, further comprising controlling the image-generating unit and the passband filter layer such that the 2D image intended for the left eye of the user and the 2D image intended for the right eye of the user:
are generated alternately, or
are generated at least partially simultaneously.

15. An assembly in a vehicle, the assembly comprising:
a windscreen and an instrument panel arranged below the windscreen, and
the autostereoscopic 3D head-up display device according to claim 9, the reflection pane of which is formed by the windscreen or a combiner pane arranged in front of the windscreen inside of a vehicle and the waveguide display assembly of which is arranged in an instrument panel such that the light beams generated by the waveguide display assembly are cast onto the reflection pane and reflected from the reflection pane to the eyes of the user, creating a virtual 3D image in the field of view of the user in front of or behind the reflection pane.

* * * * *